United States Patent
Bhattacharjee et al.

(10) Patent No.: US 9,679,003 B2
(45) Date of Patent: Jun. 13, 2017

(54) RENDEZVOUS-BASED OPTIMISTIC CONCURRENCY CONTROL

(71) Applicant: International Business Machines Corporation, Armonk, NY (US)

(72) Inventors: Bishwaranjan Bhattacharjee, Yorktown Heights, NY (US); Mustafa Canim, Ossining, NY (US); Mohammad Sadoghi Hamedani, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 14/591,053

(22) Filed: Jan. 7, 2015

(65) Prior Publication Data
US 2016/0196295 A1 Jul. 7, 2016

(51) Int. Cl.
*G06F 17/30* (2006.01)
*G06F 7/00* (2006.01)

(52) U.S. Cl.
CPC .. *G06F 17/30351* (2013.01); *G06F 17/30377* (2013.01)

(58) Field of Classification Search
USPC ........................................................ 707/607
See application file for complete search history.

(56) References Cited

U.S. PATENT DOCUMENTS

| | | | |
|---|---|---|---|
| 5,561,794 A | 10/1996 | Fortier | |
| 6,542,513 B1 | 4/2003 | Franke et al. | |
| 6,681,226 B2 | 1/2004 | Bretl et al. | |
| 7,089,244 B2 | 8/2006 | Shi et al. | |
| 7,676,638 B2 | 3/2010 | Duffy et al. | |
| 8,121,980 B2 | 2/2012 | Reid et al. | |
| 8,356,007 B2 | 1/2013 | Larson et al. | |
| 8,555,016 B2 | 10/2013 | Adl-Tabatabai et al. | |
| 8,595,446 B2 | 11/2013 | Lev et al. | |
| 2007/0219999 A1* | 9/2007 | Richey | G06F 17/30362 |
| 2011/0125973 A1* | 5/2011 | Lev | G06F 9/467 711/153 |
| 2011/0246724 A1* | 10/2011 | Marathe | G06F 9/467 711/147 |
| 2013/0103659 A1 | 4/2013 | Larson et al. | |
| 2013/0304714 A1* | 11/2013 | Lee | G06F 9/466 707/703 |

OTHER PUBLICATIONS

Bernstein et al., "Concurrency Control and Recovery in Database Systems", Addison Wesley Publishing Company, Jan. 1987, <http://freecomputerbooks.com/Concurrency-Control-and-Recovery-in-Database-Systems.html>.

Cahill et al , "Serializable Isolation for Snapshot Databases", SIGMOD'08, Jun. 9-12, 2008, Vancouver, BC, Canada, Copyright 2008 ACM, pp. 729-738.

Larson et al., "High-Performance Concurrency Control Mechanisms for Main-Memory Databases", Proceedings of the VLDB Endowment, vol. 5, No. 4, Copyright 2011 VLDB Endowment, pp. 298-309.

(Continued)

*Primary Examiner* — Kuen Lu
(74) *Attorney, Agent, or Firm* — Stephen R. Yoder

(57) ABSTRACT

A concurrent transaction validate phase with the transaction operations read, compute, and write allows for a rendezvous-based optimistic concurrency control process.

12 Claims, 9 Drawing Sheets

(56) References Cited

OTHER PUBLICATIONS

Mohan et al., "ARIES: A Transactional Recovery Method Supporting Fine-Granularity Locking and Partial Rollbacks Using Write-Ahead Logging", ACM Transactions on Database Systems, vol. 17, No. 1, Mar. 1992, © 1992, pp. 94-162.

Rawashdeh et al., "An Optimistic Approach in Distributed Database Concurrency Control", 2013 5th International Conference on Computer Science and Information Technology (CSIT), © 2013 IEEE, pp. 71-75.

Reinke et al., "Analysis and Comparison of Concurrency Control Protocols for Wireless Sensor Networks", 2011 International Conference on Distributed Computing in Sensor Systems and Workshops (DCOSS), Jun. 27-29, 2011, Barcelona, Spain, © 2011 IEEE.

Tu et al., "Speedy Transactions in Multicore In-Memory Databases", SOSP'13, Nov. 3-6, 2013, Farmington, Pennsylvania, USA, ACM, pp. 18-32.

\* cited by examiner

RENDEZVOUS-BASED OPTIMISTIC CONCURRENCY CONTROL

FIELD OF THE INVENTION

The present invention relates generally to the field of data integrity, and more particularly to efficient transactional processing.

BACKGROUND OF THE INVENTION

There is a paradigm shift in transaction processing (OLTP) from perspectives of both hardware and software. The hardware trends are toward a cheaper and larger main-memory and larger numbers of cores per processor. These trends are paving the way for OLTP databases to become entirely memory-resident (substantially faster latency) and to potentially support more concurrent environment (substantially faster throughput). The software trend is the rise of multi-version databases that avoid in-place updates of records and retain the history of data (the old and new versions of the modified record).

For state of the art optimistic models, transactions follow a strict serial path as follows: (i) reading a set of records (read phase); (ii) performing any arbitrary computation (compute phase); (iii) validating that the read records have not been changed by other transactions (validate phase); (iv) writing a set of records (write phase); and (v) committing the transaction (commit phase).

In a multi-version database system, new records do not physically replace old ones. Instead, a new version of the record is created, which becomes visible to other transactions at commit time. Conceptually, there may be many rows for a record, each corresponding to the state of the database at some point in the past. Older versions may be garbage-collected as the need for old data diminishes, in order to reclaim space for new data.

The concurrent access of the data by different transactions poses an obstacle when relying on traditional locking because reader and writer transactions are incompatible and block each other. Therefore, as the concurrency increases and resource contention between the readers and writers increases, that is, an exponential increase of processor's core count and increase in the size of main-memory, the overall utilization of a system deteriorates. This effect is further magnified when, in addition to typical short update transactions, there are long running read-only transactions that hold read locks for an extended period of time, which could essentially bring the database to stall.

The conflict between readers and writers, especially those of long readers, limits the prospect of single-version concurrency. A naive (and rather common) approach is to deal with this limitation by relaxing the consistency model and settling for transaction-inconsistent answers to queries, or by relying on an existing multi-version concurrency model (MVCC).

By keeping old data versions, a system can enable queries about the state of the database at points in the past. The ability to query the past has a number of important applications, for example: (i) a financial firm being required to retain any changes made to client information for up to five years in accordance with auditing regulations; (ii) a retailer ensuring that they offer only one discount for each product at any given time; and/or (iii) a bank retroactively correcting an error for miscalculating the promised introductory interest rate. In addition to these business-specific scenarios, there is an inherent algorithmic benefit from retaining the old versions of records and avoiding in-place updates, that is, to utilize efficient optimistic locking and latch-free data structures.

A simple implementation of a multi-version database would store the row-identifier (RID) of the old version within the row of the new version, defining a linked list of versions. Such an implementation allows for the easy identification of old versions of each row, but puts the burden of reconstructing consistent states at particular times on the application, which would need to keep timing information within each row.

To relieve applications of such burdens, a multi-version database system can maintain explicit timing information for each row. In a valid time temporal model each row is associated with an interval (begin-time, end-time) for which it was/is current. Several implementation choices exist for such a model. One could store the begin-time with each new row, and infer the end-time as the begin-time of the next version. Compared with storing both the begin-time and end-time explicitly for each row, this choice saves space and also saves some write I/O to update the old version. On the other hand, queries over historical versions are more complex because they need to consult more rows to reconstruct validity intervals.

There are several options for the physical organization of a multi-version database. For example, one organization option appends old versions of records to a "history" table and only keeps the most recent version in the main table, updating it in-place. Commercial systems have implemented this technique.

SUMMARY

In one aspect of the present invention, a method, a computer program product, and a system for processing a transaction include steps and components for: (i) responsive to a first transaction operation of a set of transaction operations performing one of reading a first record and modifying the first record, either issuing a read subscription or issuing a write publication, and (ii) entering a commit phase of the transaction based upon the following conditions: (i) the read subscription or the write publication is complete; and (ii) each transaction operation in the set of transaction operations is complete. The read subscription is issued when the first transaction operation is reading the first record. The write publication is issued when the first transaction operation is modifying the first record. At least the issuing and entering steps are performed by computer software running on computer hardware.

In another aspect of the present invention, a method, a computer program product, and a system for processing a transaction include steps and components for: (i) responsive to a first transaction operation of a set of transaction operations reading a first record, issuing a read subscription, (ii) responsive to a second transaction operation of the set of transaction operations modifying the first record, issuing a write publication, (iii) notifying a subscriber when a third transaction operation of the set of transaction operations modifies the first record, and (iv) entering a commit phase of the transaction based upon the following conditions: (i) the read subscription and the write publication are both complete; and (ii) the set of transaction operations are complete. At least the issuing a read subscription, issuing a write publication, and entering a commit phase steps are performed by computer software running on computer hardware.

DETAILED DESCRIPTION

Figure 1:
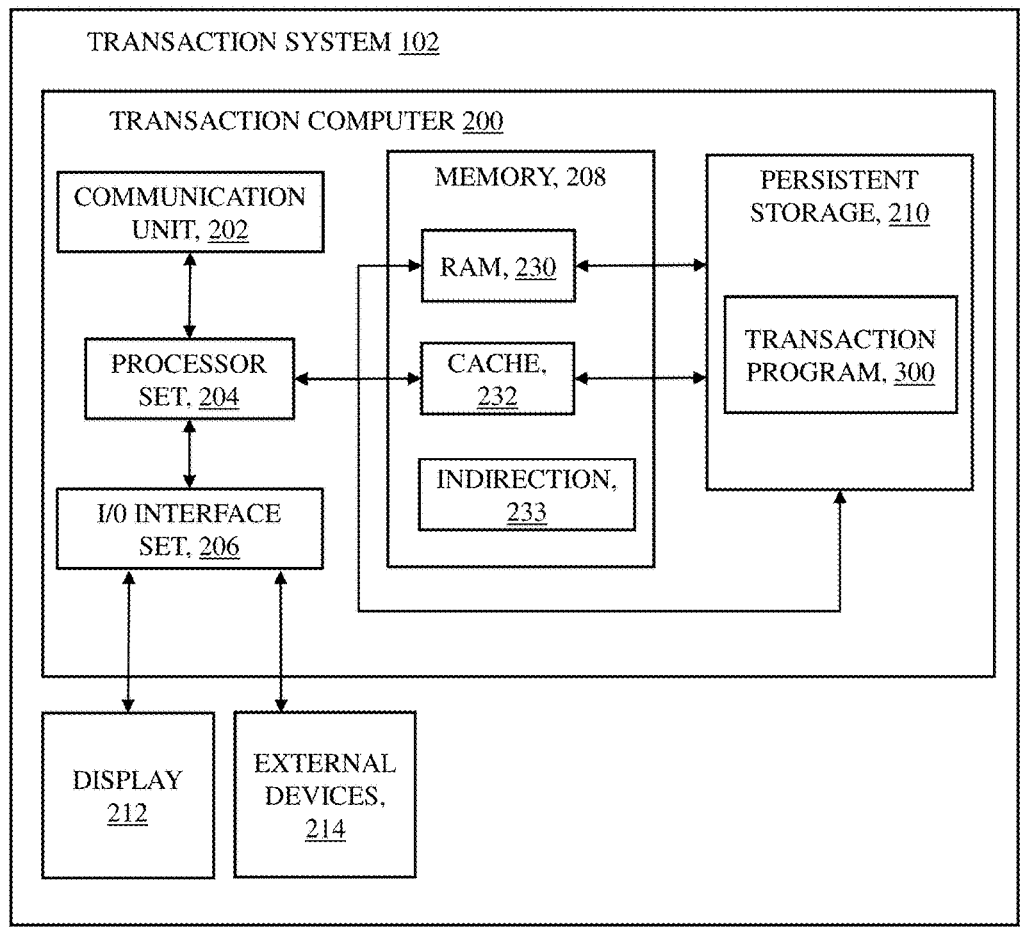
FIG. 1 is a schematic view of a first embodiment of a system according to the present invention.

A concurrent transaction validate phase with the transaction operations read, compute, and write allows for a rendezvous-based optimistic concurrency control process. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of transaction computer system 102, in accordance with one embodiment of the present invention, including: transaction computer 200; communication unit 202; processor set 204; input/output (I/O) interface set 206; memory device 208; persistent storage device 210; display device 212; external device set 214; random access memory (RAM) devices 230; cache memory device 232; transaction program 300; and indirection memory 233.

System 102 is, in many respects, representative of the various computer system(s) in the present invention. Accordingly, several portions of system 102 will now be discussed in the following paragraphs.

System 102 may be a laptop computer, tablet computer, netbook computer, personal computer (PC), a desktop computer, a personal digital assistant (PDA), a smart phone, or any other programmable electronic device. Program 300 is a collection of machine readable instructions and/or data that is used to create, manage, and control certain software functions that will be discussed in detail below.

System 102 is shown as a block diagram with many double arrows. These double arrows (no separate reference numerals) represent a communications fabric, which provides communications between various components of system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for system 102; and/or (ii) devices external to system 102 may be able to provide memory for system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

Indirection memory 233 is used for indirection mapping. In this example, the indirection memory is placed in memory 208. Alternatively, the indirection memory is placed in a solid-state drive (SSD), hard disk drive (HDD), and/or main memory. The indirection memory may be thought of as a mapping table, similar to any database table. Because the memory size required by indirection is much smaller than the overall database size, the indirection memory allocation may be placed in relatively small-size memories. That is, the indirection memory will entirely fit in a main memory or on SSDs. The indirection memory is frequently accessed, making it more convenient to place in a main memory (persistence can be achieved through logging) or on an SSD (already persistent).

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Transaction program 300 operates to process each de-coupled transaction such that there is both a message queue and an operation queue for each transaction. The separate message queue provides for validation to be performed asynchronously with read, compute, and write operations.

Some embodiments of the present invention recognize the following facts, potential problems and/or potential areas for improvement with respect to the current state of the art: (i) a key aspect in building a new generation of high-throughput memory-resident OLTP is to rethink the existing adopted non-multi-version concurrency control models that hinders concurrency because of the extensive locking and latching overhead; (ii) a shortcoming of conventional multi-version concurrency models (MVCC) is that they suffer from ad-hoc implementations that rely on slow temporary spaces (such as tempdb or rollback segments) to distinguish between old and new versions of the data; (iii) a shortcoming of conventional multi-version concurrency models (MVCC) is that they suffer from ineffective optimistic methods that rely on a prolonged validation phase at commit time with a chance of a high-abort rate; and/or (iv) using the history table approach, the temporal ordering of the data is lost and additional random I/Os are required to perform in-place updates of records.

In the discussion that follows it is assumed that there is an organization in which there is a single table containing both current and historical data. Embodiments of the present invention are not limited to this design choice. As stated earlier, a transaction consists of the following steps: (i) reading a set of records (read phase); (ii) performing any arbitrary computation (compute phase); (iii) validating that the read records (validate phase); (iv) writing a set of records (write phase); and (v) committing the transaction (commit phase). Conventionally, these phases are executed in strict serial order. The order in which the steps are executed may differ when based on a concurrency model.

A transaction in non-optimistic concurrency control is based on a strict serial order, where the validate phase typically implements some form of locking to prevent changing the read set. An optimistic concurrency control is based on a strict serial order, where the validate phase checks that the read set is not modified by any other transactions. Unlike conventional serial transaction execution models, some embodiments of the present invention are directed to a rendezvous-based optimistic concurrency control (for both multi-version and non-multi-version databases) that de-couples and parallelizes these phases by interweaving the validate phase with read, compute, and write phases.

Figure 2:
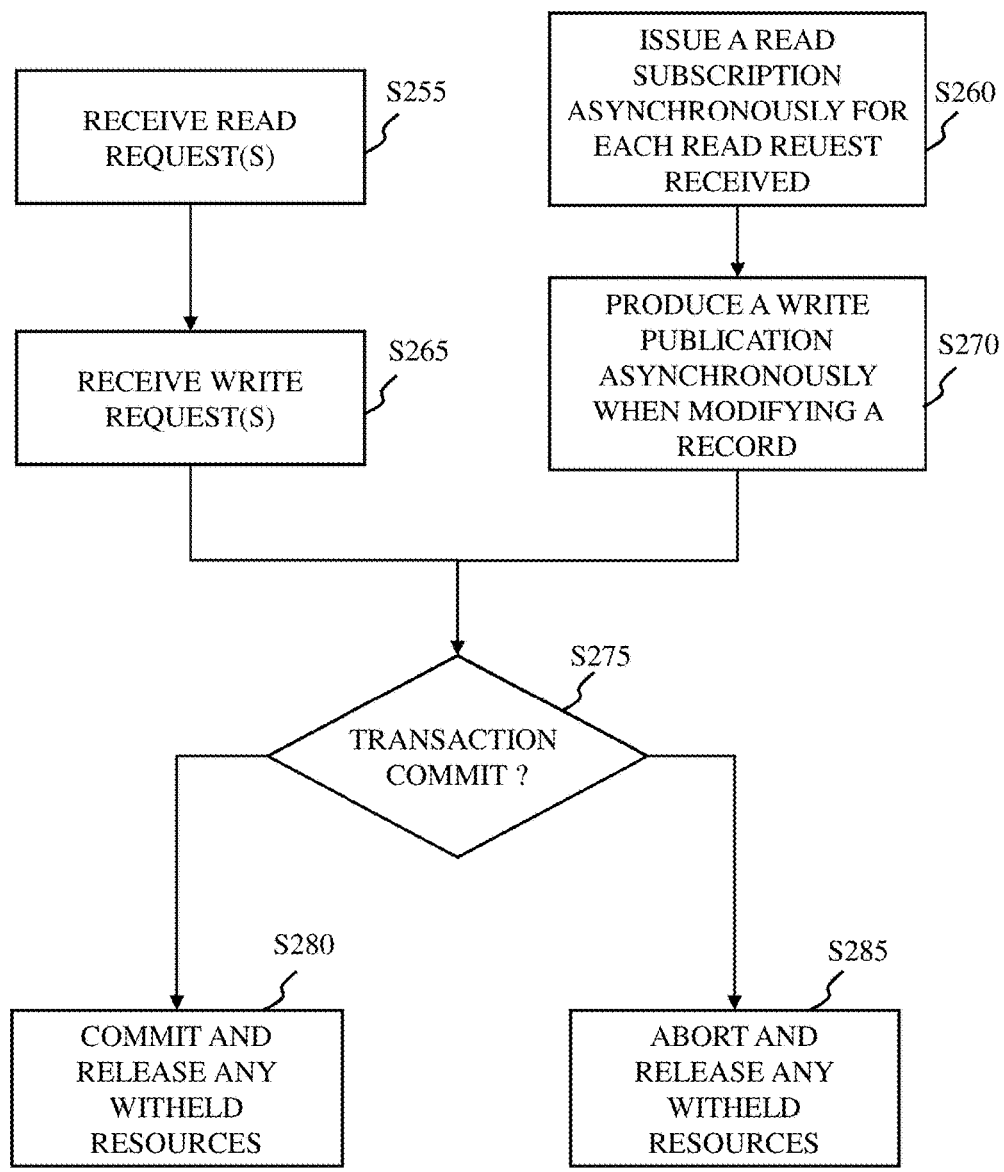
FIG. 2 is a flowchart showing a first method performed, at least in part, by the first embodiment system.
Figure 3:
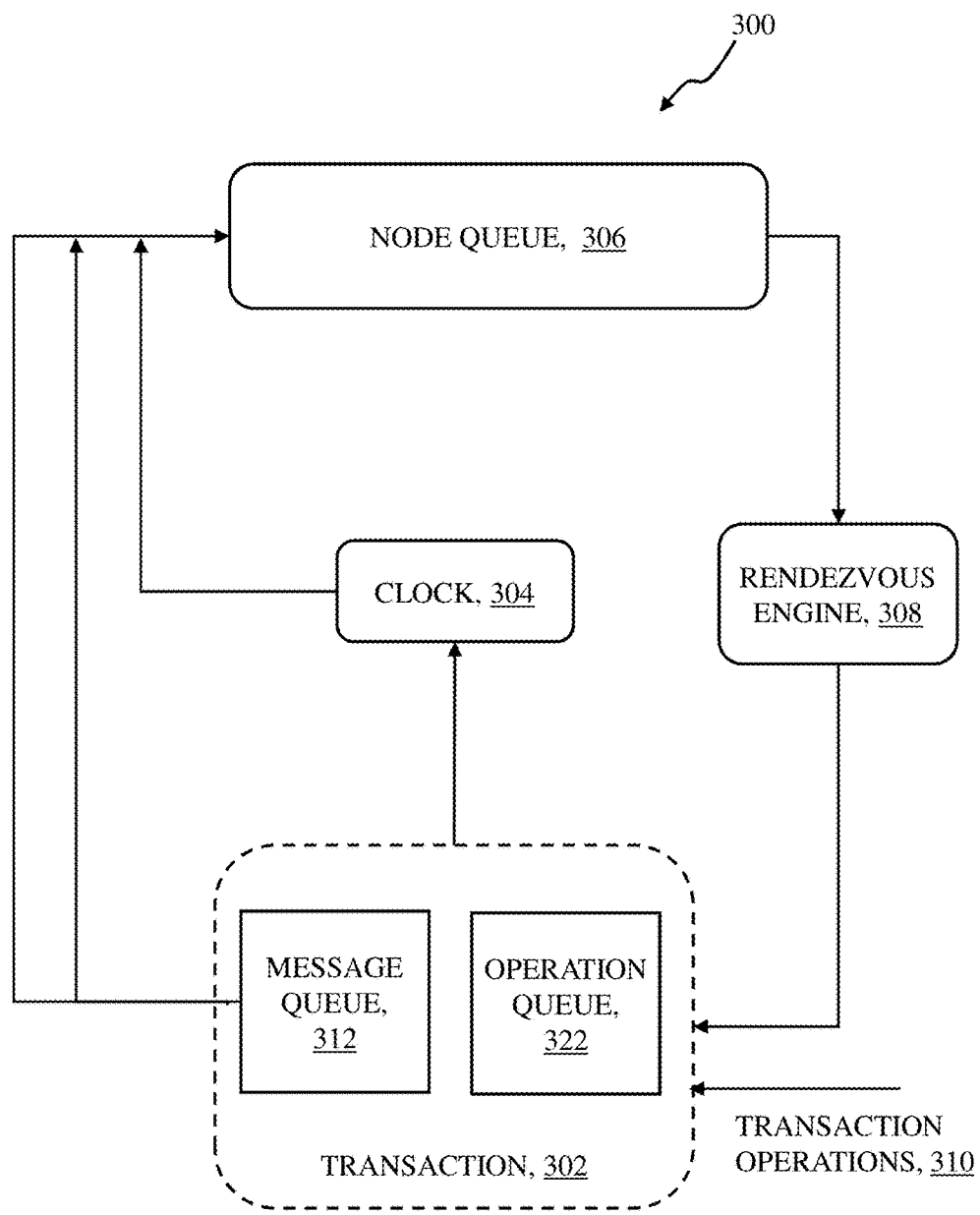
FIG. 3 is a schematic view of a first machine logic (for example, software) portion of the first embodiment system.

FIG. 2 shows a flowchart illustrating steps of process 250 for rendezvous-based optimistic concurrency control according to an embodiment of the present invention. FIG. 3 shows a conceptual model of program 300 for performing at least some of the method steps of process 250. This method and associated software will now be discussed, over the course of the following paragraphs, with extensive reference to FIG. 2 (for the method step blocks) and FIG. 3 (for the component blocks).

According to process 250, validation starts as soon as a first record is read. Processing begins at step S255, where operation queue 322, of transaction module 302, receives a read request, illustrated as transaction operations 310.

Asynchronous processing begins at step S265, where message queue 312 operates so that the validation process is decoupled from the read process, and validation is interleaved with read processes. For each read record received in step S255, the message queue asynchronously issues a message to indicate interest in receiving any changes to the read record. That is, a read subscription issues asynchronously for each read request received.

Processing proceeds to step S260, where operation queue 322 receives a write request, also illustrated as "transaction operations."

Similar to the interleaved read/validate process (steps S255 and S265), when a record is modified (write request received in step S2670) by a transaction, message queue 312 produces a write publication asynchronously (step S270). That is, a message is produced by transaction module 302 that indicates a change to a record. Essentially, transactions asynchronously subscribe to changes in their read set while transactions asynchronously also produce messages for changes to their write set. More importantly, the sending and receiving of messages as part of the validation phase are done such that it will not interfere with execution of the transaction operations Read, Compute, and Write (RCW) phases. In that way, validation is interleaved and concurrently executed with RCW phases. To achieve correctness, both the validation and RCW phases must be completed before entering the final commit phase.

Conceptual model 300 divides a transaction into two queues: message queue (MQ) 312; and operation queue (OQ) 322. These queues roughly correspond to each phase of the transaction. MQ manages the validation phase while OQ manages the RCW phases. MQ sends read set subscription messages (e.g., a read request for a single record or a predicate-based request for a range of records) and write set subscription messages, and MQ receives relevant publication messages that indicate a change. In this example, the operation queue includes operations found in Step S255 and S260, while the message queue includes steps S265 and S270, where subscriptions and publications are managed.

Processing proceeds from the dual queue process, discussed above, to decision step S275, where clock module 304 receives commit time request(s) and publishes, or records, the commit time to node queue 306. In this example, the commit time is published as a timestamp identifying the commit time, also referred to as the commit timestamp. If the transaction is to be committed, "Yes" branch, processing proceeds to step S280. If the transaction is not to be committed, "No" branch, processing proceeds to step S285. In some embodiments, transaction module 302 listens to the commit time recorded by clock module 304 for those transactions that changed its read set. Knowing the commit time supports implementing optimistic multi-version concurrency control using time-stamping. In addition to transaction's queues, MQ and OQ, the node hosting the execution transaction also maintains node queue (NQ) 306.

The correctness of the rendezvous-based concurrency model, conceptual model 300, is proven using partial ordering of the messages sent and received. The minimum required partial ordering for any transaction, $T_1$ and $T_2$, is given by the following weak partial order: (i) all read/write messages of $T_i$ are sent before the commit message of $T_i$ is sent, such that no delivery ordering is enforced on the read/write messages of $T_i$, so long as each message is reliably delivered and processed/acknowledged; and (ii) if the transaction $T_1$ is committed at $c_1$ and the transaction $T_2$ is committed at $c_2$, then $c_1$ is always delivered before $c_2$, assuming that $c_1$ and $c_2$ are delivered reliably and acknowledged.

All messages that are sent by NQ 306 are passed to rendezvous engine (RE) 308. The RE selectively sends publications to interested subscribers. The RE remembers the last committed/uncommitted write messages for each record. These write messages are temporarily held in order to fulfill subscriptions of active transactions that arrived late. The correctness is guaranteed because the commit time publication from clock 304 is received only after all conflicting write operations have been received (according to the above-mentioned partial ordering). Therefore, as soon as the transaction commit time is received, a determination as to whether the transaction has satisfied the desired isolation-level can be made.

Following the "Yes" branch, processing ends at step S280, where transaction module 302 commits the transaction and releases any withheld resources.

Following the "No" branch, processing ends at step S285, where transaction module 302 aborts the transaction and releases any withheld resources.

Some embodiments of the present invention support one or more of the following isolation levels: (i) uncommitted read (UR) is achieved when uncommitted data is read without considering commit dependencies whereby no read set subscriptions for validation are required (i.e., transaction under UR is always read-only with no updates allowed, thereby no write publication is produced); (ii) cursor stability (CS) is achieved when the last committed version is always read and no commit dependency is needed (i.e., no read set subscription for validation is required and write publications are produced when a transaction under CS modifies a record; (iii) read stability (RS) is achieved when a read subscription is issued for the read set, a write publication is produced for the write set; and (iv) repeatable read (RR) is achieved when a read subscription is issued for a read set that includes a phantom possibility (To detect the phantom possibility, either a read subscription for the next-key is issued (to detect any future insert violation) or predicate-based read subscriptions are issued, for example, issuing a read message based on RIDs (or any other record unique identifier), a subscription could be formulated using a predicate, e.g., to a range of the keys between 5 and 34, simply a read set subscription is issued with the predicate [5 <key <34]).

The committed write messages could be dropped if the commit time is before the oldest active transactions and the uncommitted messages are dropped when the producing transaction is aborted.

Figure 4:
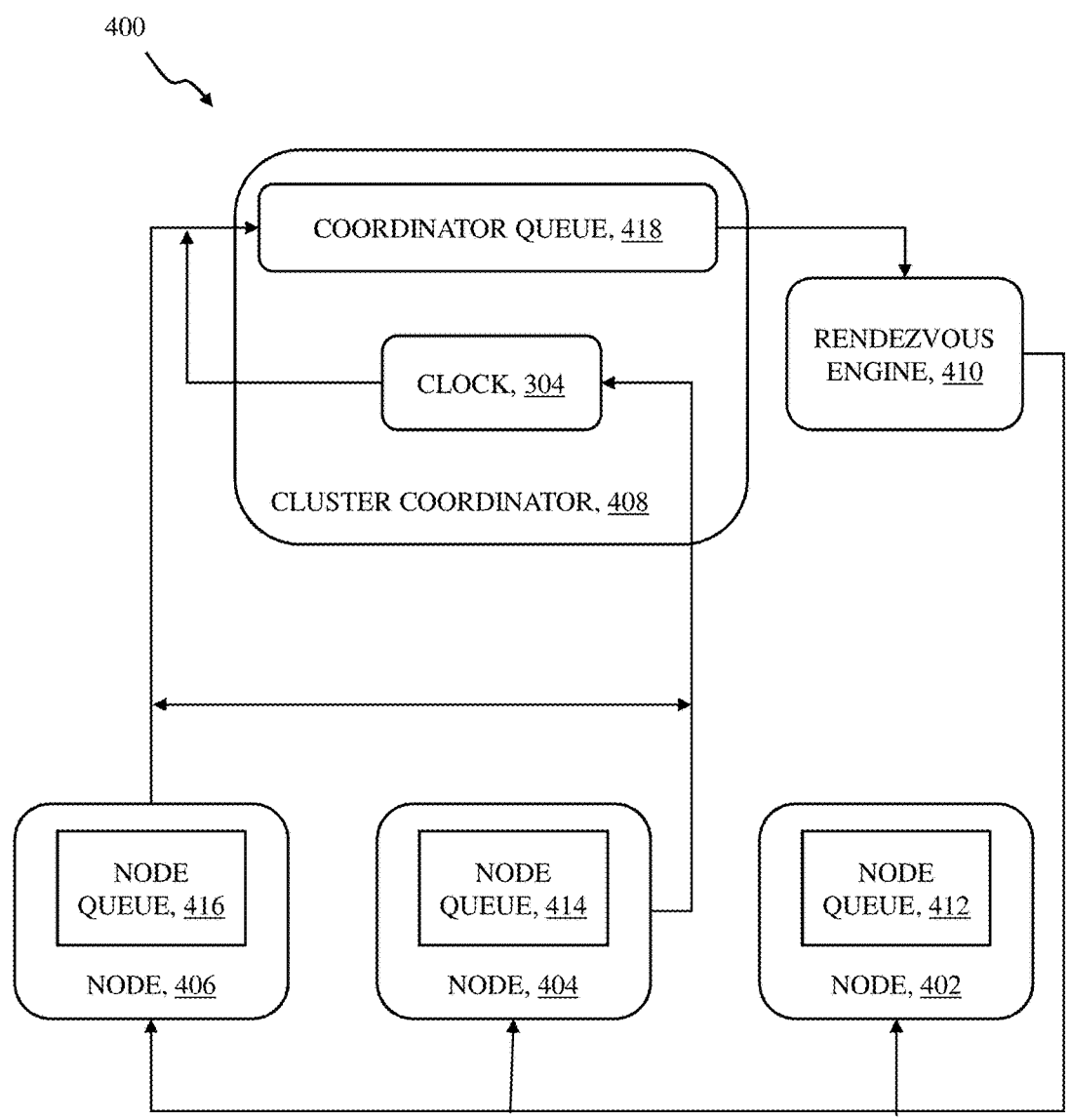
FIG. 4 is a schematic view of a second machine logic (for example, software) portion of the first embodiment system.

FIG. 4 illustrates distributed environment 400 and provides an overview of communication for shared-architecture using cluster coordinator 408. The cluster coordinator may also be referred to in the art as a cluster accelerator. Some embodiments of the present invention extend the optimistic protocol to distributed environment 400 as follows: (i) distributed processing in shared or non-shared clustered architecture may occur; (ii) speculative reads are also supported by subscribing to an updating transaction commit time, via clock module 428 (speculative ignore is also supported by issuing read subscriptions to be notified if a record is changed before the reading transaction commits); (iii) hybrid transaction is supported such that certain read records (perhaps frequently changed records), and a shared lock is requested (pessimistic approach), while, for the other records, a read subscription is issued (optimistic approach). Each node 402, 404, and 406 includes corresponding individual node queues 412, 414, and 416. As described above, distributed processing is centralized at cluster coordinator 408, where coordinator queue 418 operates as a centralized node queue. In that way, all messages in the distributed environment that are sent by coordinator queue 418 are passed to rendezvous engine (RE) 410.

Figure 5:
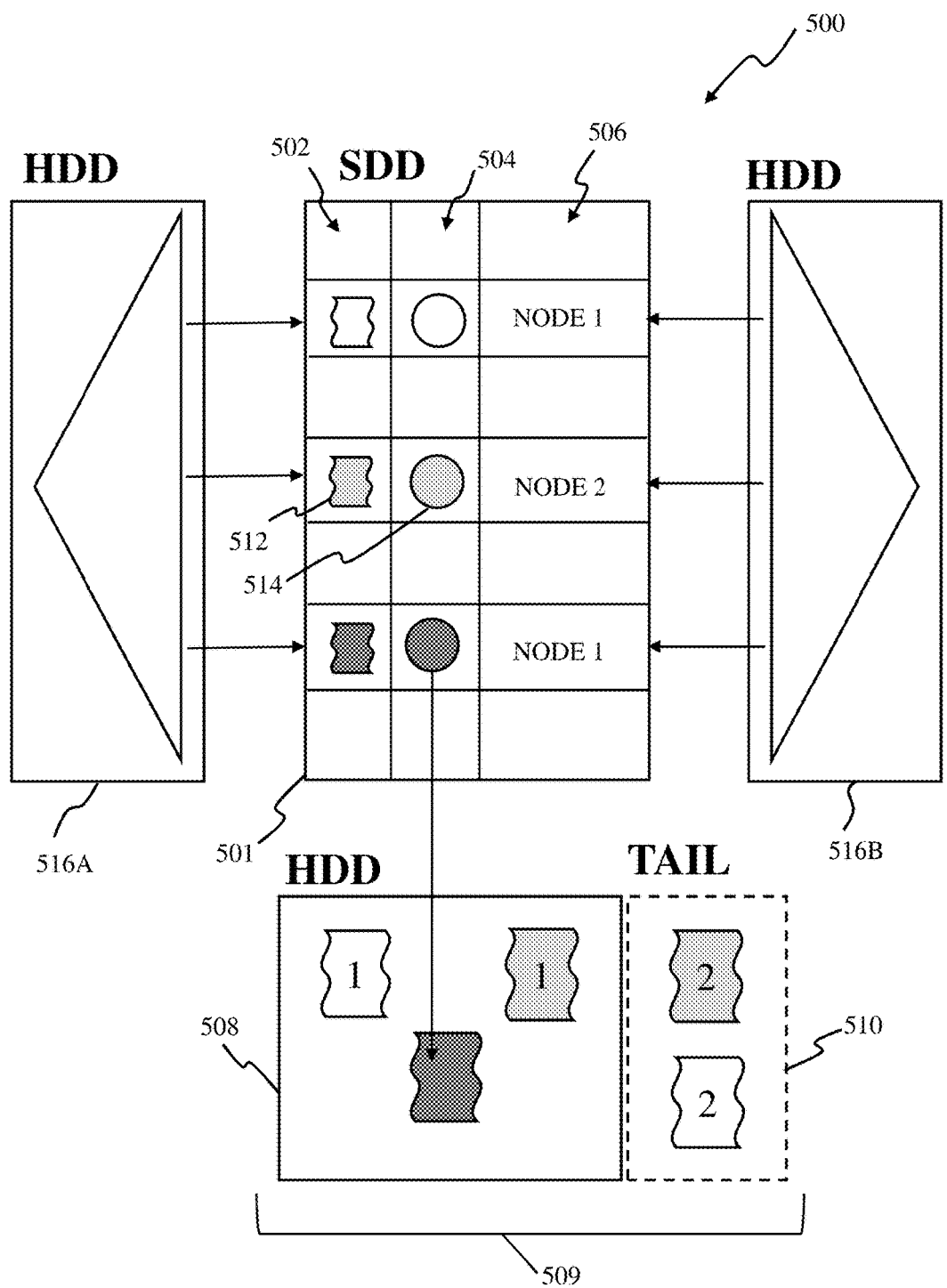
FIG. 5 is a schematic view of a third machine logic (for example, software) portion of a system according to an embodiment of the present invention.

FIG. 5 is a schematic diagram view of indirection technique 500 with logical record identifiers (LIDs). Conventional index structures directly reference a record via a pointer known as a physical row-identifier (RID). The RID usually encodes a combination of the database partition identifier, the page number within the partition, and the row number within the page. The choice of a physical identifier hinders the update performance of a multi-version database in which updates result in a new physical location for the updated record. Changes to the record induce random access for every index, even indexes on "unaffected" attributes, i.e., attributes that have not changed. Random accesses are required to modify leaf pages.

To avoid random accesses for indexes on unaffected attributes, some embodiments of the present invention apply a conventional technique for decoupling the physical and logical representations of records spanning many versions. This provides for distinguishing between a physical row-identifier (RID), represented in column 504, and a logical record identifier (LID), represented in column 502. For any given record, there may be many RIDs for that record corresponding to the physical placement of all of the versions of that record, such as relation store 508. In contrast, the LID is a reference to the RID representing the most recent version of the record. To support understanding, an example of a table "LtoR(LID,RID)" is provided. This table has a LID as the primary key. Indexes, such as 516a and 516b, contain LIDs rather than RIDs in their leaves.

Using this indirection technique, an index traversal must convert a LID, such as LID 512, to a RID, such as RID 514, using the LtoR table, such as table 501. A missing LID, or a LID with a NULL RID in the LtoR table is treated as a deleted row, and ignored during a search. When an existing record is modified, a new version of that record is created. The LtoR table is updated to associate the new row's RID to the existing LID. That way, indexes on unchanged attributes remain valid. Only for the changed attribute value will random access to the index be required.

When a record is deleted, the (LID,RID) pair for this record in the LtoR table is deleted. Index traversals ignore missing LIDs. Indexes can lazily update their leaves during traversal, when a periodic read I/O is performed. At that time, any missing LIDs encountered lead to the removal of those LIDs from the index leaf page. After a long period of activity, indexes should be validated off-line against the LtoR table to remove deleted LIDs that have subsequently never been searched for.

When a new record is added, the new record is appended to the tail, such as tail store 510, of relation set 509 and its RID is fetched and associated to a new LID. The (LID, RID) pair for the new record is added to the LtoR table. All indexes are also updated with the new record LID accordingly.

The illustrated indirection technique extends indirection to include ownership information in addition to LID-to-RID mapping by maintaining on a per-record basis a LID-to-Owner mapping, for example record owner column 506. In this model, each database thread $t_i$ is assigned an owner identification (ID), $o_1$, and each agent $a_i$ responsible for executing a transaction $e_k$ is assigned to a thread, such as $t_i$. Once the agent is assigned to a thread $t_i$, then both the assigned agent and the transaction inherit the thread owner's ID, $o_i$, and the transaction is executed (namely its validation policy) using the inherited owner ID.

This mapping plays an essential role in applying selective validation and reducing the number of necessary validation messages generated. In particular, a read subscription is issued if and only if a transaction reads a record that is not owned by its hosting thread. Accordingly, reading a local record (those owned by the hosting thread) is based on a validation-free protocol. If the record owner's ID, retrieved using LID-to-Owner matching, matches the thread owner's ID that is hosting the transaction, then no read validation is required. However, when reading a non-local record, a record which is owned by another thread, then normal validation protocol is used and a read subscription is issued.

When updating a local record, again, the procedure is straightforward and no changes are necessary. However, when updating a non-local record, a specific routine addressing the non-local record is applied. There are at least two options depending on the circumstances: (i) online ownership change; and (ii) deferred ownership change.

As for the online ownership change, if a transaction requires writing to a non-local record, with no outstanding writes on the record, then the ownership of the record is changed and the record is made local to the writing transaction. In that way, any owner transition forces all active transactions running on the thread of the previous owner to validate their local reads or check whether any of the local reads overlap with the record whose owner is changed. This validation is performed before the commit time so that changes to the transitioned record are not delayed until all currently-active transactions commit.

Regarding the deferred ownership change, if a transaction requires writing to a non-local record (with no outstanding writes), then it waits until all active transactions running on the threads owning the record commit before changing the ownership.

It should be noted that selective ownership-based validation, as illustrated in FIG. 5, is orthogonal to a multi-version database and the LID-to-RID indirection mapping is not necessary. So long as there is a mechanism to identify the record owner, such as LID-to-Owner mapping, selective ownership-based validation is enabled.

Figure 6:
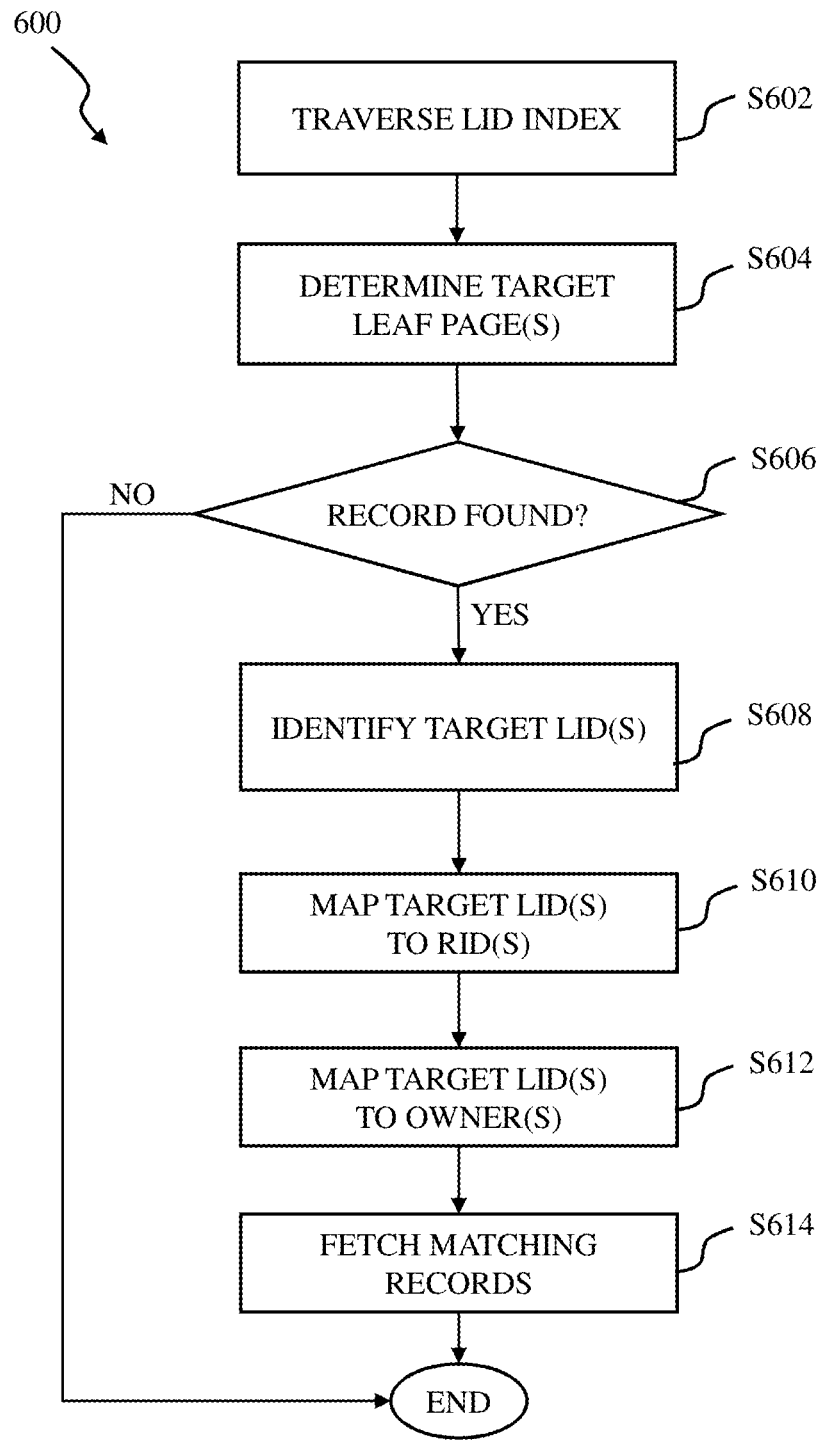
FIG. 6 is a flowchart showing a second method performed according to an embodiment of the present invention.

FIG. 6 is a flowchart of process 600 for searching a record using an ownership indirection layer, for example, searching for all records with the value V on column C using the LID index IC on column C. Processing begins at step S602, where the LID index is traversed. In this example, LID index IC is traversed for the value V.

Processing proceeds to step S604, where target leaf pages are determined. In this example, the rendezvous-based optimistic concurrency control (ROCC) program finds all leaf pages (if any) containing entries for the value V.

Processing proceeds to decision step S606, where it is decided whether or not a record is found in the target leaf pages determined in step S604. If a desired record is found, the "Yes" branch advances to step S608. If no desired record is found processing ends.

Following the "Yes" branch, processing proceeds to step S608, where target LID(s) are identified. In this example, the ROCC program reads all of the LIDs in the leaf page whose records have the value V for column C.

Processing proceeds to step S610, where the target LID(s) are mapped to corresponding RID(s).

Processing proceeds to step S612, where the target LID(s) are mapped to corresponding owner(s), or to ownership identifiers.

Processing proceeds to step S614, where matching records are fetched, using the corresponding RID(s) mapped in step S610. Processing proceeds to end.

Figure 7:
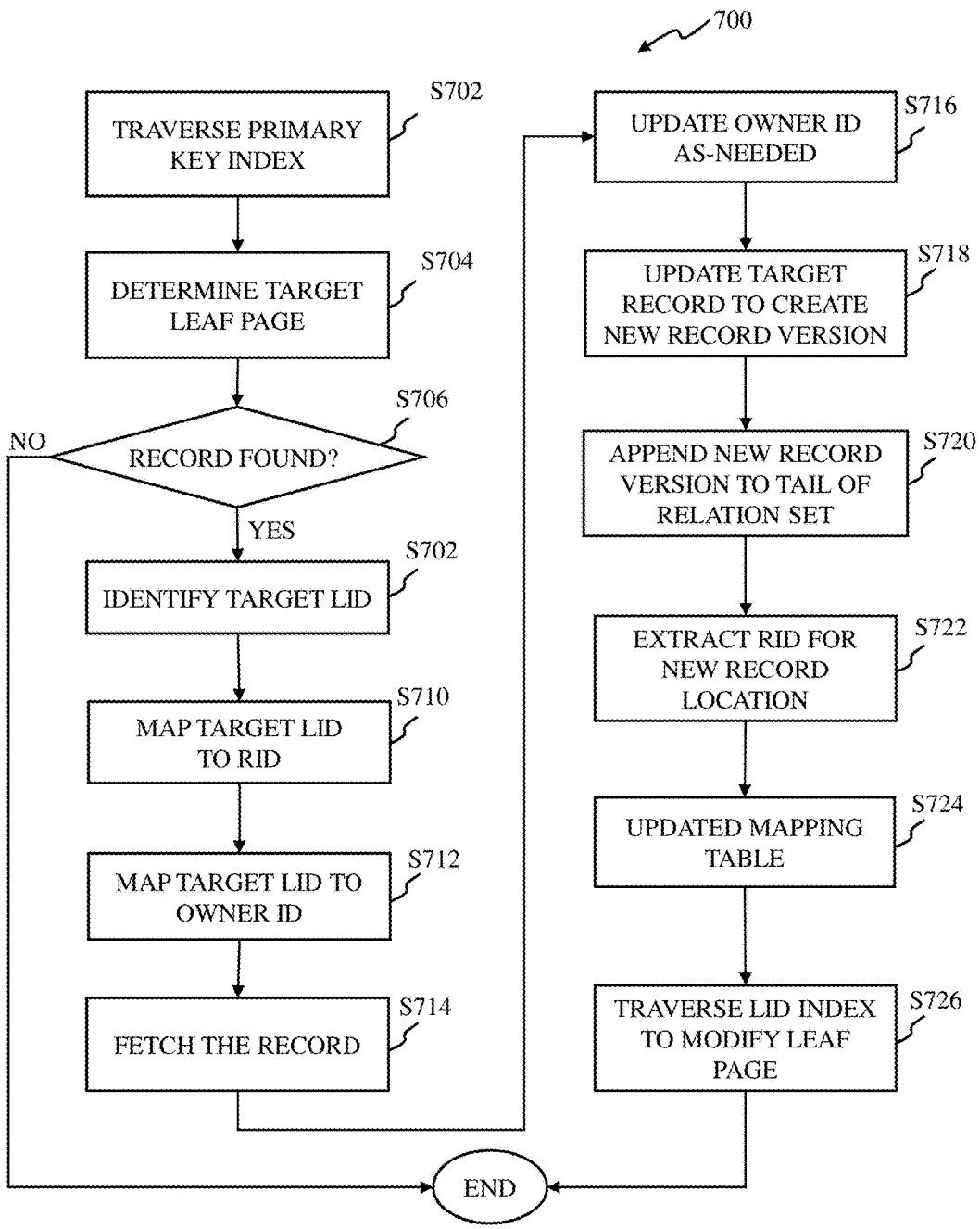
FIG. 7 is a flowchart showing a third method performed according to an embodiment of the present invention.

FIG. 7 is a flowchart of process 700 for updating a record using an ownership indirection layer, for example, updating the record $r_i$ (in the relation set R) with the key $k_i$ by changing the value of column C from $V_1$ to $V_2$, where there is a primary key index PK on the relation set R and the index IC on column C. Processing begins at step S702, where the primary key index is traversed. In this example, the index PK is traversed for the record $r_i$ with the key $k_i$.

Processing proceeds to step S704, where a target leaf page is determined. In this example, ROCC program searches for the leaf page (if any) that contains the key $k_i$.

Processing proceeds to step S706, where it is decided whether or not a record is found in the target leaf page determined in step S704. If a desired record is found, the "Yes" branch advances to step S708. If no desired record is found processing ends.

Following the "Yes" branch, processing proceeds to step S708, where a target LID is identified. In this example, the ROCC program reads the LID for the record $r_i$ with the key $k_i$.

Processing proceeds to step S710, where the target LID is mapped to a corresponding RID.

Processing proceeds to step S712, where the target LID is mapped to a corresponding owner, or to an ownership identifier.

Processing proceeds to step S714, where the found record is fetched. In this example, the ROCC program uses the RID to fetch the record $r_i$.

Processing proceeds to step S716, where the owner identifier is updated if the owner thread is different from the thread running the update transaction.

Processing proceeds to step S718, where the target record is updated to create a new record version. In this example, the ROCC program updates the record $r_i$, where the value for the column C is changed from $V_1$ to $V_2$.

Processing proceeds to step S720, where the new record version, created in step S718, is appended to the tail of the corresponding relation set. In this example, the ROCC program appends the new version of the record $r_i$ to the tail of the relation set R.

Processing proceeds to step S722, where the new RID for the new record location is extracted.

Processing proceeds to step S724, where the mapping table is updated. In this example, the ROCC program updates the RID entry in the mapping table (LID, RID) with the new RID.

Processing proceeds to step S726, where the LID index is traversed to modify the leaf page. In this example, the ROCC program traverses the index IC for value $V_2$ to insert an entry for the record with the key $k_i$ in the leaf page. Processing proceeds to end.

Figure 8:
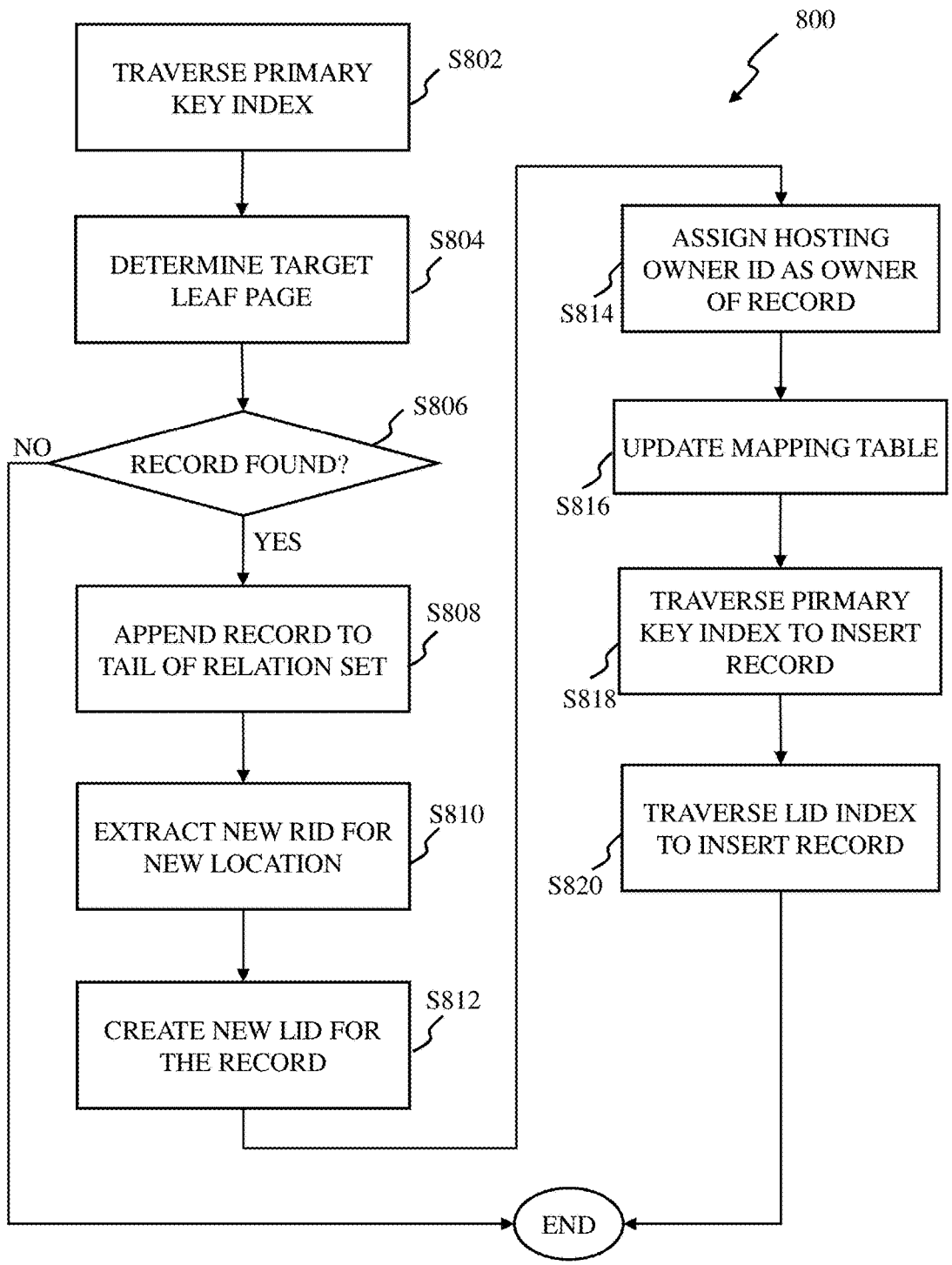
FIG. 8 is a flowchart showing a fourth method performed according to an embodiment of the present invention.

FIG. 8 is a flowchart of process 800 for inserting a record using the ownership indirection layer, for example, inserting the record $r_i$ (in the relation set R) with the key $k_i$ having the value V for the column C, where there is a primary key index PK on the relation set R and an LID index IC on column C. Processing begins at step S802, where the primary key index is traversed. In this example, the index PK is traversed for the record $r_i$ with the key $k_i$.

Processing proceeds to step S804, where the target leaf page is determined. In this example, the ROCC program finds the leaf page (if any) containing the key $k_i$.

Processing proceeds to step S806, where it is decided whether or not a record is found in the target leaf page determined in step S804. If a desired record is not found, the "No" branch advances to step S808. If the desired record is found processing ends.

Following the "No" branch, processing proceeds to step S808, where the found record is appended to the tail of the relation set. In this example, the ROCC program appends the record $r_i$ to the tail of the relation set R.

Processing proceeds to step S810, where the new RID is extracted for the new location.

Processing proceeds to step S812, where a new LID is created for the record. In this example, the ROCC program creates a new LID for the record $r_i$.

Processing proceeds to step S814, where the hosting owner ID is assigned as the owner of the record. In this example, the ROCC program assigns thread's owner identifier, hosting the update transaction, as the owner of the newly created record $r_i$.

Processing proceeds to step S816, where the mapping table is updated. In this example, the ROCC program inserts into the mapping table the (LID, RID) and (LID, Ownership) entry for the newly created record, where the RID is the location of the inserted record.

Processing proceeds to step S818, where the primary key index is traversed to insert the record. In this example, the ROCC program traverses the primary key index PK to insert the record $r_i$ with the key $k_i$.

Processing proceeds to step S820, where the LID index is traversed to insert the record. In this example, the ROCC program traverses the LID index IC to insert the record $r_i$ with the value V for the column C. Processing proceeds to end.

Figure 9:
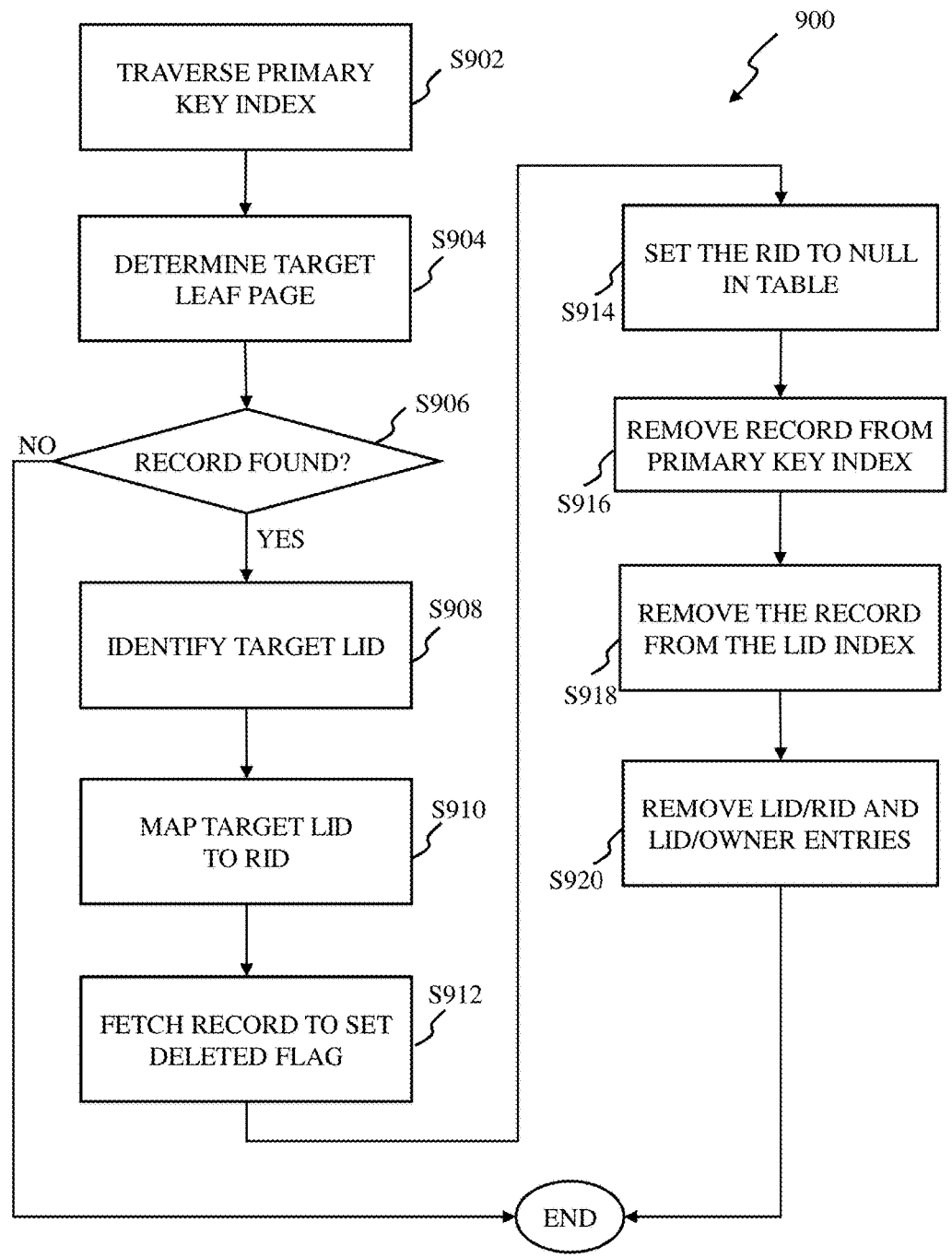
FIG. 9 is a flowchart showing a fifth method performed according to an embodiment of the present invention.

FIG. 9 is a flowchart of process 900 for deleting a record using the indirection layer, for example, deleting the record $r_i$ (in the relation set R) with the key $k_i$ having value V for the column C, where there is a primary key index PK on the relation set R and an LID index IC on column C. Processing begins at step S902, where the primary key index is traversed. In this example, the index PK is traversed for the record $r_i$ with the key $k_i$.

Processing proceeds to step S904, where the target leaf page is determined. In this example, the ROCC program finds the leaf page (if any) containing the key $k_i$.

Processing proceeds to step S906, where it is decided whether or not a record is found in the target leaf page determined in step S904. If a desired record is found, the "Yes" branch advances to step S908. If no desired record is found processing ends.

Following the "Yes" branch, processing proceeds to step S908, where the target LID is identified. In this example, the ROCC program reads the LID for the record $r_i$ with the key $k_i$.

Processing proceeds to step S910, where the target LID is mapped to the RID. In this example, the ROCC program maps the LID to the RID using the RID.

Processing proceeds to step S912, where the record to be deleted is fetched to set the deleted flag. In this example, the ROCC program uses the RID to fetch the record $r_i$ and sets the deleted flag for the record $r_i$.

Processing proceeds to step S914, where the RID is set to null in the table. In this example, the ROCC program sets the RID to null in the (LID, RID) indirection table.

Processing proceeds to step S916, where the record is removed from the primary key index. In this example, the ROCC program traverses the primary key index PK to remove the record $r_i$ with the key $k_i$.

Processing proceeds to step S918, where the record is removed from the LID index. In this example, the ROCC program traverses the LID index IC to remove the record $r_i$ with the value V for the column C.

Processing proceeds to step S920, where the (LID, RID) and the (LID, Ownership) entries are removed. Processing proceeds to end.

Some embodiments of the present invention recognize that each transaction may have many read and/or write operations that are intervened, or interwoven, within the transaction process. A single transaction, could have, for example, the following operations (where X, Y, Z, U are different data items/records): (i) Read X; (ii) Read Y; (iii) Write X (modify and write the initial read X value); (iv) Read Z; (v) Read U; and (vi) Write Z (modify and write the initial read Z value). That is to say, the transaction is not limited to only two operations in strict order.

Some embodiments of the present invention allow for a transaction to modify a value, such as the value X, without reading it. For example, a transaction could modify the value of "John Smith Salary" by first reading the current value of "John Smith Salary" or a transaction can just write a new value for "John Smith Salary" without first reading the current value.

Some embodiments of the present invention may include one, or more, of the following features, characteristics, and/or advantages: (i) eliminates the lengthy validation phase that is executed only after all transaction's expensive computation is completed; (ii) reduces commit-time abort of transaction and can determine changes of read records at a much earlier phase; (iii) de-couples validation and read, compute, and write phases; (iv) sends all read/write messages asynchronously and in parallel; (v) allows a predicate-based read subscription to avoid phantom in RR isolation level; (vi) enables optimistic lock-free concurrency control; (vii) provides a proactive and fast (almost free) validation phase; (viii) achieves early abort-detection; (ix) facilitates the co-existence of optimistic and pessimistic concurrency control; (x) does not commit to any one of these implementation options, each of which might be a valid choice for some workloads; (xi) reduces the I/O burden of index updates using an indirection technique; (xii) efficiently implements multi-version concurrency control using existing locking infrastructure in commercial databases; and (xiii) as a transaction progresses the validation step, or phase, is concurrently processed, avoiding commit-time validation using logs; and/or (xiv) optimizes any general optimistic protocol.

Some embodiments of the present invention may include one, or more, of the following features, characteristics, and/or advantages: (i) not limited to transactional memory; (ii) does not defer the validation phase of the transaction until the commit time, but processes the validation phase concurrently with transaction operations prior to the commit process; (iii) exploits rendezvous-based message-passing for an optimistic concurrency control mechanism; (iv) optimizes the validation steps in a transaction of an optimistic concurrency protocol with rendezvous messaging; (v) avoids lengthy commit-time validation; and (vi) optimizes the validation steps of an optimistic concurrency protocol with rendezvous messaging subsystems.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for processing a transaction, the method comprising:
    decoupling a validation operation from one or more of a read operation, a write operation, and a compute operation of a transaction to establish a set of transaction operations;
    responsive to a first transaction operation of a set of transaction operations reading a first record, issuing a read subscription;
    responsive to a second transaction operation of the set of transaction operations modifying the first record, issuing a write publication;
    notifying the read subscription when a third transaction operation of the set of transaction operations modifies the first record;
    entering a commit phase of the transaction based upon the following conditions: (i) the read subscription and the write publication are both complete; and (ii) the set of transaction operations are complete;
    committing the transaction based, at least in part, upon receiving a publication of a transaction commit timestamp before receiving a committed write publication; and
    aborting the transaction based, at least in part, upon receiving a committed write publication for a transaction operation not within the set of transaction operations that modified the first record;
    wherein:
    at least the issuing a read subscription, issuing a write publication, and committing the transaction steps are performed by computer software running on computer hardware.

2. The method of claim 1, wherein the transaction is divided into two queues, a message queue and an operation queue.

3. The method of claim 1, wherein the validation operation is performed asynchronous to a performance of the one or more of a read operation, a write operation, and a compute operation of the transaction.

4. The method of claim 1, further comprising:
    requesting a transaction timestamp based upon the following conditions: (i) the read subscription and the write publication are both complete; and (ii) the set of transaction operations are complete.

5. A computer program product for processing a transaction, the computer program product comprising a computer readable storage medium having stored thereon:
    first program instructions programmed to decouple a validation operation from one or more of a read operation, a write operation, and a compute operation of a transaction to establish a set of transaction operations;
    second program instructions programmed to, responsive to a first transaction operation of a set of transaction operations reading a first record, issue a read subscription;
    third program instructions programmed to, responsive to a second transaction operation of the set of transaction operations modifying the first record, issue a write publication;
    fourth program instructions programmed to notify the read subscription when a third transaction operation of the set of transaction operations modifies the first record;
    fifth program instructions programmed to enter a commit phase of the transaction based upon the following conditions: (i) the read subscription and the write publication are both complete; and (ii) the set of transaction operations are complete;
    sixth program instructions programmed to commit the transaction based, at least in part, upon receiving a publication of a transaction commit timestamp before receiving a committed write publication; and
    seventh program instructions programmed to abort the transaction based, at least in part, upon receiving a committed write publication for a transaction operation not within the set of transaction operations that modified the first record.

6. The computer program product of claim 5, wherein the transaction is divided into two queues, a message queue and an operation queue.

7. The computer program product of claim 5, wherein the validation operation performed asynchronous to a performance of the one or more of a read operation, a write operation, and a compute operation of the transaction.

8. The computer program product of claim 5, further comprising:
    fifth program instructions programmed to request a transaction timestamp based upon the following conditions: (i) the read subscription and the write publication are both complete; and (ii) the set of transaction operations are complete.

9. A computer system for processing a transaction, the computer system comprising:
    a processor(s) set; and
    a computer readable storage medium;
    wherein:
    the processor set is structured, located, connected, and/or programmed to run program instructions stored on the computer readable storage medium; and
    the program instructions include:
    first program instructions programmed to decouple a validation operation from one or more of a read operation, a write operation, and a compute operation of a transaction to establish a set of transaction operations;
    second program instructions programmed to, responsive to a first transaction operation of a set of transaction operations reading a first record, issue a read subscription;

third program instructions programmed to, responsive to a second transaction operation of the set of transaction operations modifying the first record, issue a write publication;

fourth program instructions programmed to notify the read subscription when a third transaction operation of the set of transaction operations modifies the first record;

fifth program instructions programmed to enter a commit phase of the transaction based upon the following conditions: (i) the read subscription and the write publication are both complete; and (ii) the set of transaction operations are complete;

sixth program instructions programmed to commit the transaction based, at least in part, upon receiving a publication of a transaction commit timestamp before receiving a committed write publication; and seventh program instructions programmed to abort the transaction based, at least in part, upon receiving a committed write publication for a transaction operation not within the set of transaction operations that modified the first record.

10. The computer system of claim 9, wherein the transaction is divided into two queues, a message queue and an operation queue.

11. The computer system of claim 9, wherein the validation operation is performed asynchronous to a performance of the one or more of a read operation, a write operation, and a compute operation of the transaction.

12. The computer system of claim 9, the program instructions further include:
fifth program instructions programmed to request a transaction timestamp based upon the following conditions: (i) the read subscription and the write publication are both complete; and (ii) the set of transaction operations are complete.

* * * * *